US011892333B2

(12) United States Patent
Ogata et al.

(10) Patent No.: US 11,892,333 B2
(45) Date of Patent: Feb. 6, 2024

(54) FLOW-RATE MEASURING DEVICE

(71) Applicant: Hitachi Astemo, Ltd., Hitachinaka (JP)

(72) Inventors: Masatoshi Ogata, Tokyo (JP); Norio Ishitsuka, Tokyo (JP); Takahiro Miki, Hitachinaka (JP); Akira Uenodan, Hitachinaka (JP); Takayuki Yogo, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 364 days.

(21) Appl. No.: 17/423,946

(22) PCT Filed: Jan. 21, 2020

(86) PCT No.: PCT/JP2020/001809
§ 371 (c)(1),
(2) Date: Jul. 19, 2021

(87) PCT Pub. No.: WO2020/179249
PCT Pub. Date: Sep. 10, 2020

(65) Prior Publication Data
US 2022/0082421 A1    Mar. 17, 2022

(30) Foreign Application Priority Data
Mar. 4, 2019 (JP) ................. 2019-038139

(51) Int. Cl.
*G01F 1/68* (2006.01)
*G01F 1/684* (2006.01)
*G01F 15/14* (2006.01)

(52) U.S. Cl.
CPC ............ *G01F 1/6842* (2013.01); *G01F 15/14* (2013.01)

(58) Field of Classification Search
None
See application file for complete search history.

(56) References Cited

U.S. PATENT DOCUMENTS

| 2011/0140211 A1 | 6/2011 | Kono et al. |
| 2013/0061684 A1 | 3/2013 | Frauenholz et al. |
| 2013/0192388 A1 | 8/2013 | Kono et al. |
| 2017/0211958 A1 | 7/2017 | Yogo et al. |

(Continued)

FOREIGN PATENT DOCUMENTS

| CN | 106537099 A | 3/2017 |
| JP | 2011-122984 A | 6/2011 |

(Continued)

OTHER PUBLICATIONS

International Search Report (PCT/ISA/210) issued in PCT Application No. PCT/JP2020/001809 dated Apr. 7, 2020 with English translation (eight (8) pages).

(Continued)

Primary Examiner — Harshad R Patel
(74) Attorney, Agent, or Firm — Crowell & Moring LLP

(57) ABSTRACT

An object is to improve measurement accuracy of a thermal air flow meter. A flow-rate measuring device comprising: a sensor assembly having a flow-rate detecting element; a circuit board on which the sensor assembly is mounted; and a housing on which the circuit board is mounted, wherein the sensor assembly is mounted on the circuit board such that a detection portion side of the flow-rate detecting element is closer to the housing, and the sensor assembly includes a contact portion in contact with the housing on the detection portion side.

14 Claims, 25 Drawing Sheets

(56) References Cited

U.S. PATENT DOCUMENTS

2018/0306619 A1    10/2018   Uenodan et al.
2018/0372521 A1    12/2018   Millies et al.
2019/0120675 A1    4/2019   Watanabe et al.

FOREIGN PATENT DOCUMENTS

JP    2017-190948 A    10/2017
JP    2018-538537 A    12/2018
WO    WO 2012/049934 A1    4/2012
WO    WO 2017/073271 A1    5/2017

OTHER PUBLICATIONS

Japanese-language Written Opinion (PCT/ISA/237) issued in PCT Application No. PCT/JP2020/001809 dated Apr. 7, 2020 (three (3) pages).

English translation of Chinese Office Action issued in Chinese Application No. 202080006908.7 dated Aug. 26, 2023 (6 pages).

FLOW-RATE MEASURING DEVICE

TECHNICAL FIELD

The present invention relates to a flow-rate measuring device that measures a flow rate of a gas to be measured.

BACKGROUND ART

As an example of a flow-rate measuring device that measures a gas flow rate, a technique such as PTL 1 is disclosed. PTL 1 discloses that a positioning element is formed in a housing of an air flow meter, and the positioning element is engaged in a positioning element accommodating portion formed in a sensor element support, whereby an air mass sensor element is precisely positioned in an air guiding path.

CITATION LIST

Patent Literature

PTL 1: JP 2018-538537 A

SUMMARY OF INVENTION

Technical Problem

However, PTL 1 does not disclose reduction of dimensional variation of the distance between the detection element and the sub-passage wall surface facing the detection element, and there is room for study.

An object of the invention is to provide an accurate flow-rate measuring device with reduced dimensional variation.

Solution to Problem

In order to achieve the above object, a flow-rate measuring device of the invention includes a sensor assembly having a flow sensing element, a circuit board on which the sensor assembly is mounted, and a housing on which the circuit board is mounted. The sensor assembly is mounted on the circuit board such that a detection portion side of the flow-rate detecting element is closer to the housing. The sensor assembly includes a contact portion in contact with the housing on the detection portion side.

Advantageous Effects of Invention

According to the invention, it is possible to provide an accurate flow-rate measuring device with reduced dimensional variations.

DESCRIPTION OF EMBODIMENTS

Hereinafter, embodiments of the invention will be described using the drawings.

First Embodiment

A first embodiment of a thermal air flow meter will be described with reference to FIGS. 1 to 6.

Figure 1:
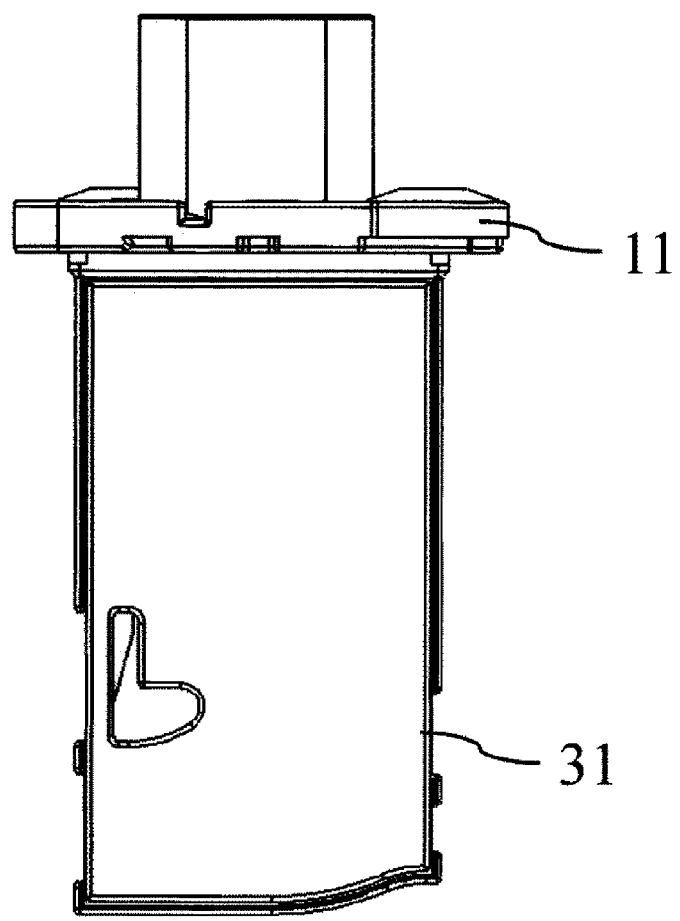
FIG. 1 is a plan view of a thermal air flow meter according to a first embodiment of the invention.
Figure 2:
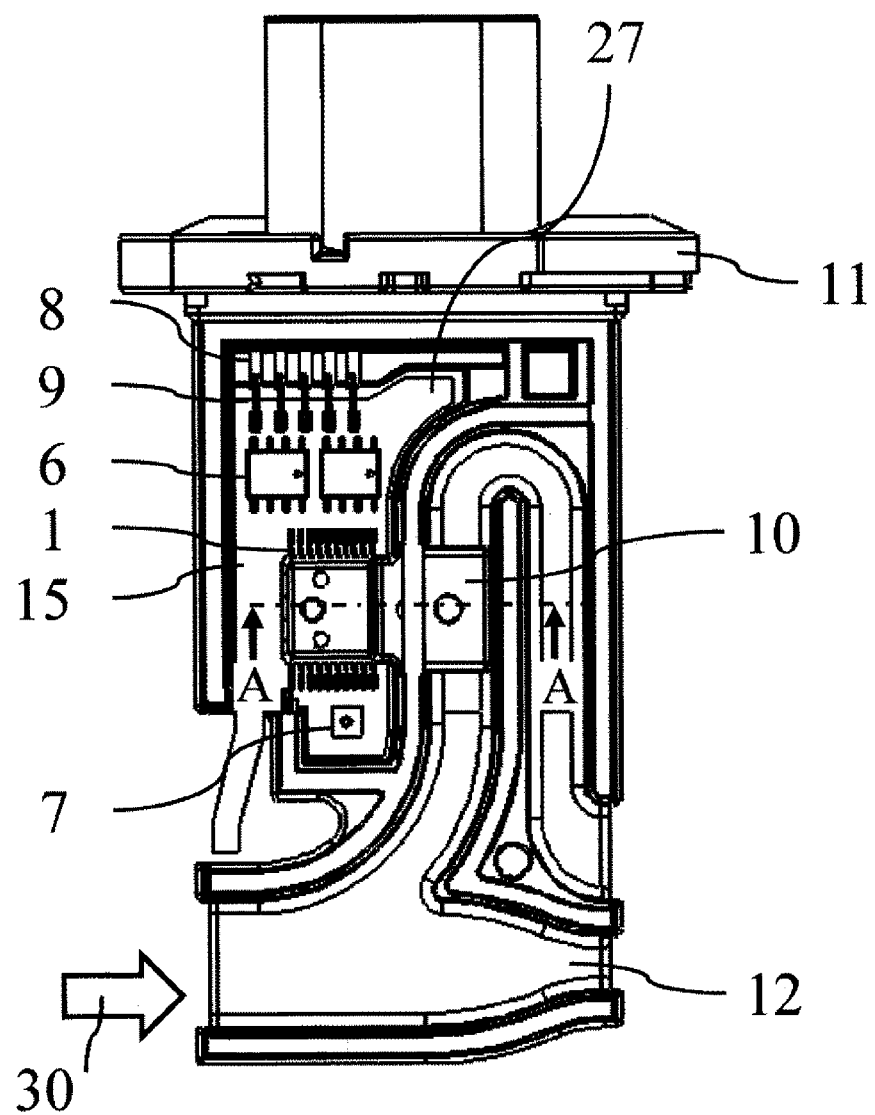
FIG. 2 is a plan view of the thermal air flow meter according to the first embodiment of the invention before attachment of a cover.

As illustrated in FIGS. 1 and 2, the thermal air flow meter in this embodiment includes a housing 11 constituting a part of the sub-passage 12, a cover 31, a circuit board 15 mounted on the housing, and a sensor assembly 10 electrically connected to the circuit board 15. The housing 11 includes a connector terminal 8, and the circuit board 15 is electrically connected to the connector terminal 8 by, for example, a wire 9 after being mounted on the housing 11. Thereafter, the cover 31 is fixed to the housing 11. The cover 31 and the housing 11 are fixed by, for example, an adhesive 17. In the housing 11, a sub-passage groove for forming the sub-passage 12 is formed, and the sub-passage 12 for taking in the air 30 as the medium to be measured is formed in cooperation with the cover 31. The sub-passage groove may be formed in the cover 31, and the sub-passage groove may not be formed in the housing 11.

Figure 3:
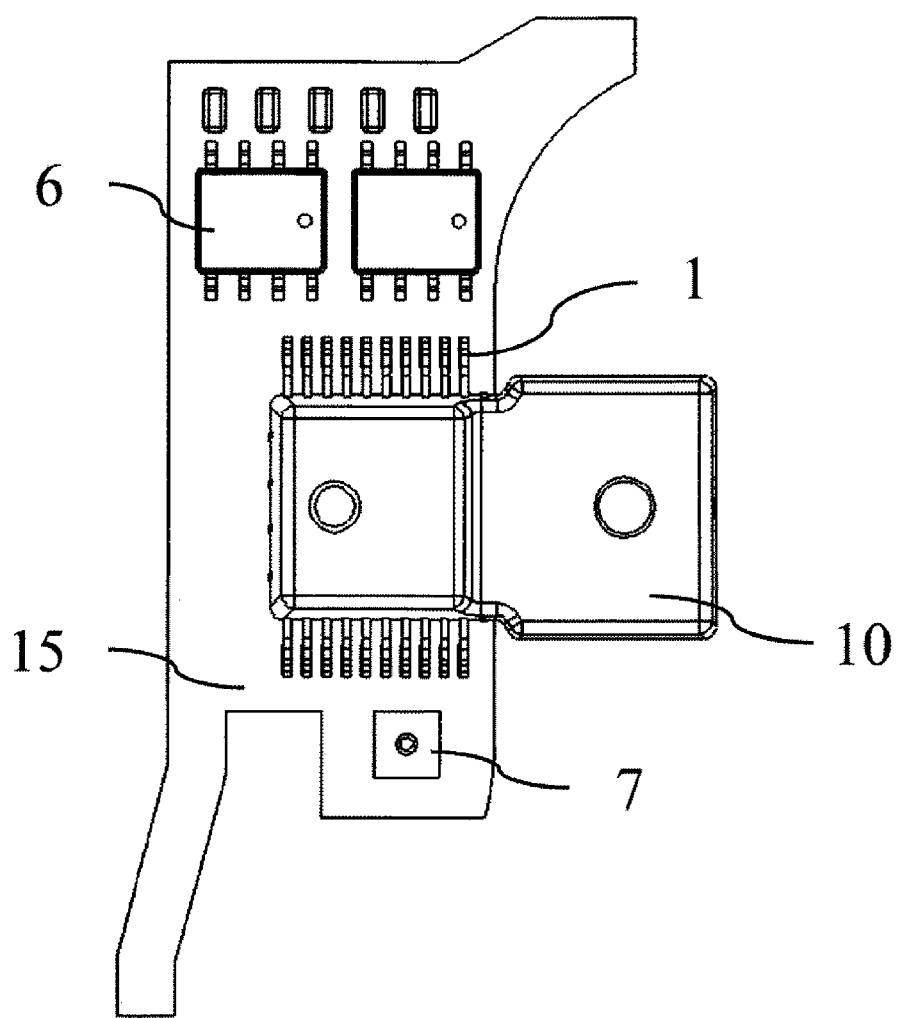
FIG. 3 is a plan view of a circuit board and a sensor assembly according to the first embodiment of the invention.
Figure 4:
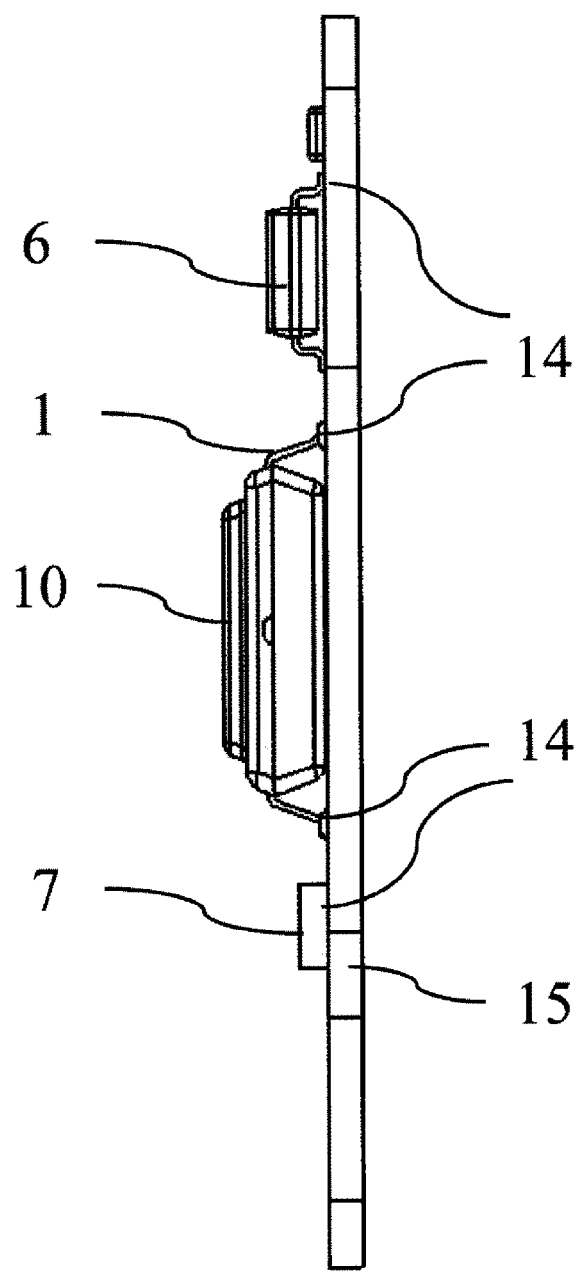
FIG. 4 is a rear view of the circuit board and the sensor assembly according to the first embodiment of the invention.
Figure 5:
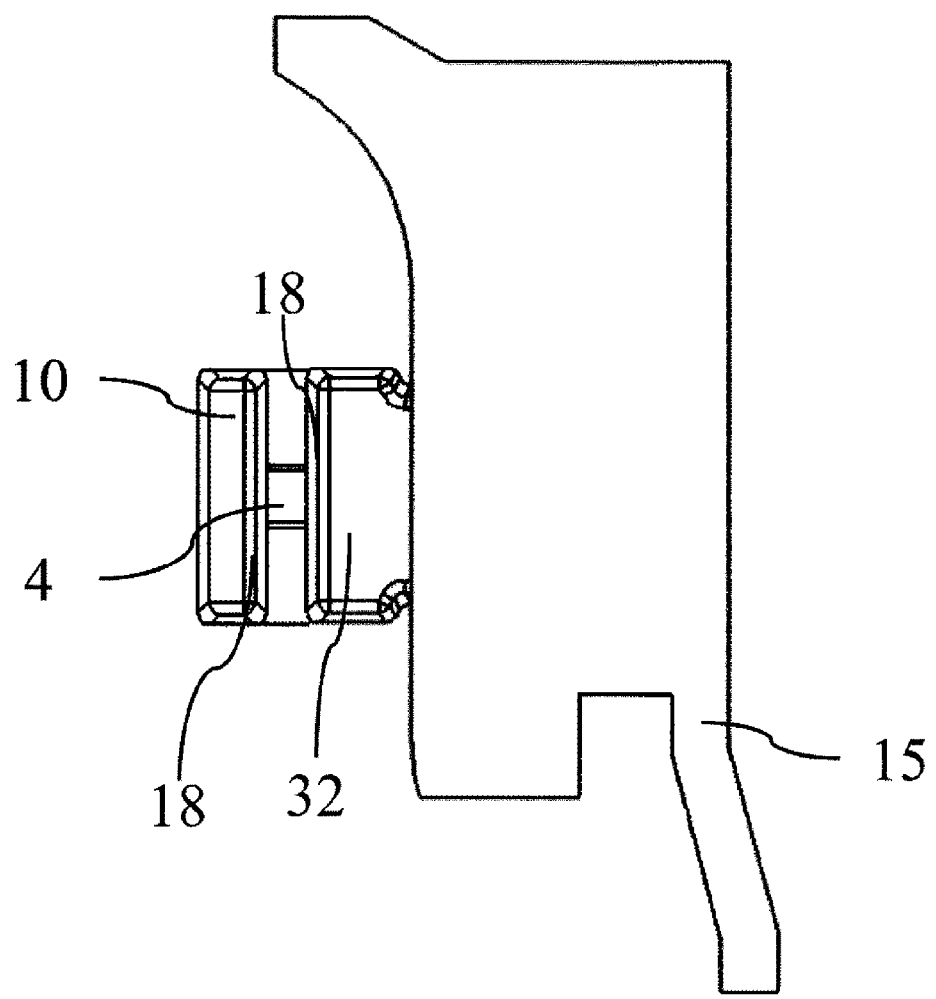
FIG. 5 is a bottom view of the circuit board and the sensor assembly according to the first embodiment of the invention.

As illustrated in FIGS. 3 to 5, a circuit board assembly in which the sensor assembly 10 is mounted on the circuit board 15 is configured. In addition to the sensor assembly 10 having a flow-rate detecting element 4 for measuring the gas flow rate, mounted components such as a pressure sensor 6 and a humidity sensor 7 are electrically connected to the circuit board 15 via a connection portion 14. Examples of the connection portion 14 include solder and gold wire. By selecting whether to mount the pressure sensor 6 and the humidity sensor 7 according to needs, it is possible to provide a thermal air flow meter having various configurations. In the sensor assembly 10, a detection portion of the flow-rate detecting element 4 is located in the sub-passage 12. In addition, the sensor assembly 10 is formed such that the detection portion side and the mounting unit side on the circuit board 15 are on the same side. The sensor assembly 10 is mounted on the circuit board 15 such that a detection portion side of the sensor assembly 10 faces a mounting surface side of the circuit board 15 on which various sensors such as the sensor assembly 10 are mounted. The sensor assembly 10 includes a side wall 18 provided so as to protrude toward the upper surface side (housing 11 side) from the detection portion, and includes a contact portion 32 in contact with the housing 11 on the upper surface of the side wall 18.

The sensor assembly 10 includes a lead frame 1, the flow-rate detecting element 4 disposed on the lead frame 1, and an LSI 3. The flow-rate detecting element 4 is a semiconductor element formed by a MEMS process, and includes a thin portion (detection portion) in which a heating element is formed. The flow-rate detecting element 4 and the LSI 3 are electrically connected via a gold wire 2. The sensor assembly 10 is a resin package that seals the flow-rate detecting element 4, the LSI 3, and the lead frame 1 with resin, and has a structure in which a flow-rate detection portion of the flow-rate detecting element 4 is partially exposed. Note that the LSI 3 and the flow-rate detecting element 4 may be integrated, or the LSI 3 may be fixed to the circuit board 15. In addition, the sensor assembly 10 may have a structure in which a flow-rate measuring element 4 is mounted on a resin molding (sensor support) in which a metal terminal is sealed with resin. The sensor assembly 10 includes at least a flow-rate detecting element and a member that supports the flow-rate detecting element.

Figure 6:
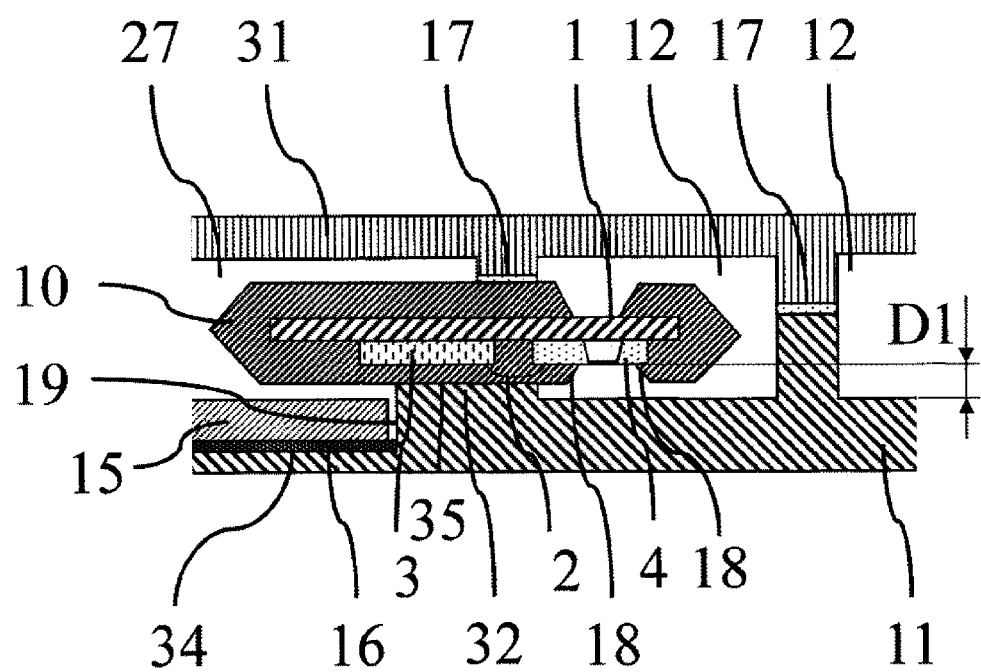
FIG. 6 is a cross-sectional view of the thermal air flow meter according to the first embodiment of the invention taken along line A-A in FIG. 2.

As illustrated in FIG. 6, a circuit assembly in which the sensor assembly 10 is mounted on the circuit board 15 is configured. A part of the sensor assembly 10 is arranged to protrude from the circuit board 15. The circuit assembly is mounted on the housing 11 constituting a part of the sub-passage wall surface such that the flow-rate detection portion is disposed in the sub-passage. The sensor assembly 10 is disposed in the housing 11 such that the detecting element 4 side is the housing 11 side. A part of the sensor assembly 10 on the detecting element side is in contact with the housing 11. By disposing a buffering material 16 such as an adhesive between the circuit board mounting portion of the housing 11 and the circuit board 15, the circuit board 15 (circuit board assembly) is fixed to the housing 11. In the housing 11, a step 19 is formed such that the circuit board mounting portion is positioned outside the sensor assembly contact portion. The height of the step 19 is formed to be larger than the height from the circuit board bottom surface assembly (the surface opposite to the surface on which the sensor assembly 10 is mounted) of the circuit board assembly to a housing contact portion of the sensor assembly 10. Then, the buffering material 16 is provided so as to fill a gap formed between the circuit board bottom surface and the circuit board mounting portion of the housing 11.

The distance (hereinafter, referred to as D1 or D1 dimension) between the flow-rate detecting element 4 and the surface of the sub-passage 12 facing the flow-rate detecting element 4 is a factor that affects noise performance, low flow rate sensitivity, and pulsation performance. Therefore, it is extremely important to reduce the dimensional variation of D1 in order to provide an accurate flow-rate measuring device. In a case where the circuit board assembly in which the sensor assembly 10 is mounted on the circuit board 15 is mounted on the housing, when the circuit board assembly is simply stacked as described in PTL 1, a variation in the thickness of the housing, the sensor assembly, the circuit board, and the cover is included in the cause of the dimensional variation of D1.

In this embodiment, the sensor assembly 10 is mounted on the circuit board 15 such that the detection portion side of the flow-rate detecting element 4 is closer to the housing 11, and the sensor assembly 10 is configured to include the contact portion 32 in contact with the housing 11 on the detection portion side, so that it is possible to exclude the thickness variation between the circuit board 15 and the cover 31 from the factor of the D1 dimensional variation, and it is possible to provide an accurate flow-rate measuring device.

In addition, it is preferable that the housing 11 includes the step 19 because the sensor assembly 10 can be easily brought into contact with the housing 11 when the circuit board assembly is mounted on the housing 11.

It is more preferable that the height of the step 19 is formed to be larger than the height from the circuit board bottom surface (the surface opposite to the surface on which the sensor assembly 10 is mounted) of the circuit board assembly to the housing contact portion of the sensor assembly 10, and the buffering material 16 is provided between the circuit board bottom surface and the circuit board mounting portion. When the circuit board assembly is mounted on the housing 11, a part of the sensor assembly 10 is pressed and mounted such that the sensor assembly 10 comes into contact with the housing 11. If the circuit board 15 pushes up the sensor assembly 10 due to the tolerance variation of the circuit board 15, there is a possibility that stress is generated in the connection portion 14 and the connection portion 14 between the sensor assembly 10 and the circuit board 15 is damaged, and the yield is deteriorated. The height of the step is set such that a gap is formed between the circuit board bottom surface and the circuit board mounting portion, and the buffering material 16 is provided between the circuit board bottom surface and the circuit board mounting portion, whereby a variation in the thickness of the circuit board 15 is absorbed by the buffering material 16, so that stress concentration on the connection portion 14 can be reduced. The buffering material 16 is desirably made of a material having low viscosity before curing, such as a silicon-based adhesive or gel.

Figure 7:
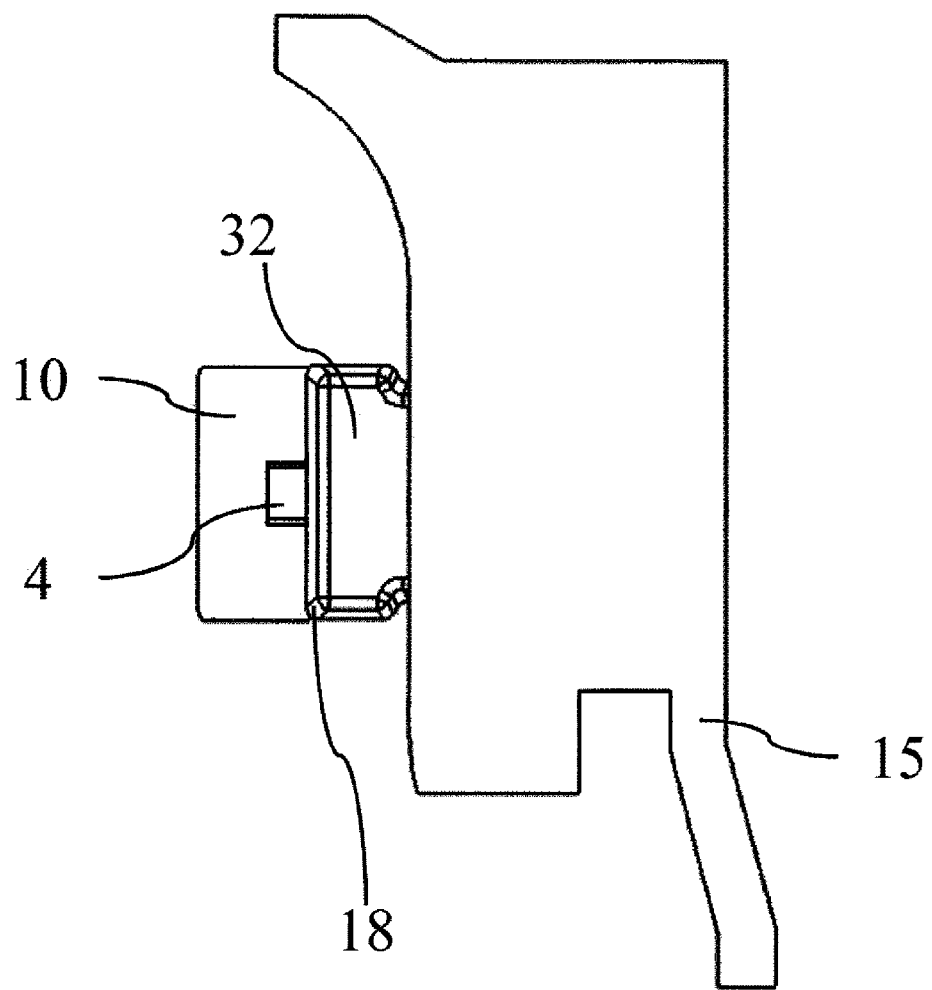
FIG. 7 is a bottom view of the circuit board and the sensor assembly according to the first embodiment of the invention.
Figure 8:
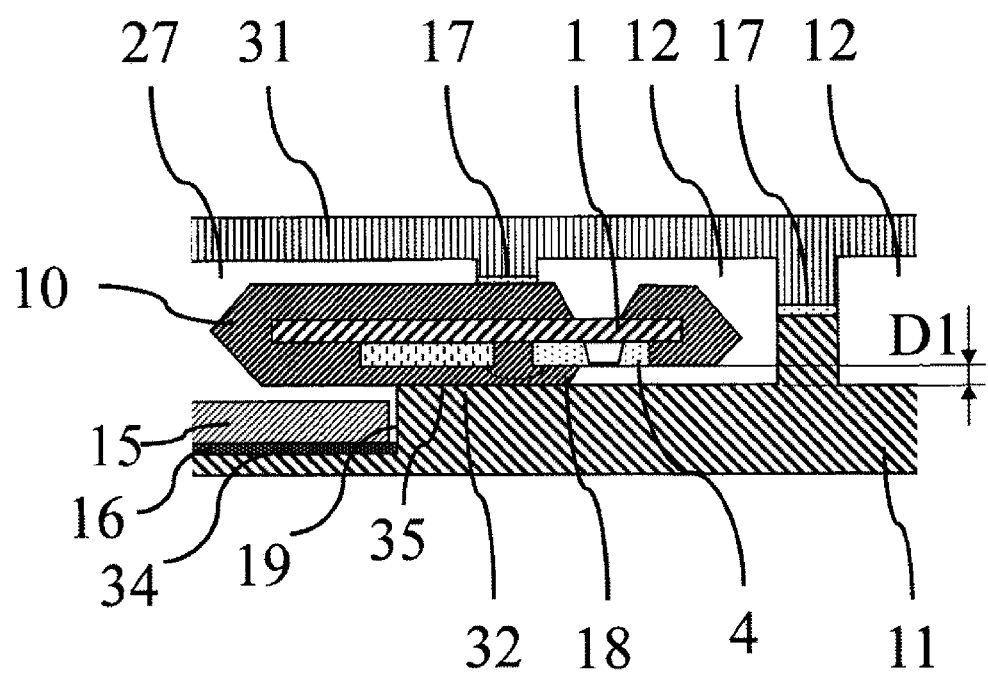
FIG. 8 is a cross-sectional view of the thermal air flow meter according to the first embodiment of the invention taken along line A-A in FIG. 2.

In addition, as illustrated in FIGS. 7 and 8, the distal end side of the sensor assembly 10 may not be at the same height as the contact portion 32, and may have a structure substantially flush with the detection surface of the detecting element 4. In other words, the side wall 18 may not be formed on the distal end side.

Second Embodiment

A second embodiment of this embodiment will be described with reference to FIGS. 9 to 12. Further, the description of the same configuration as that of the first embodiment is omitted.

Figure 9:
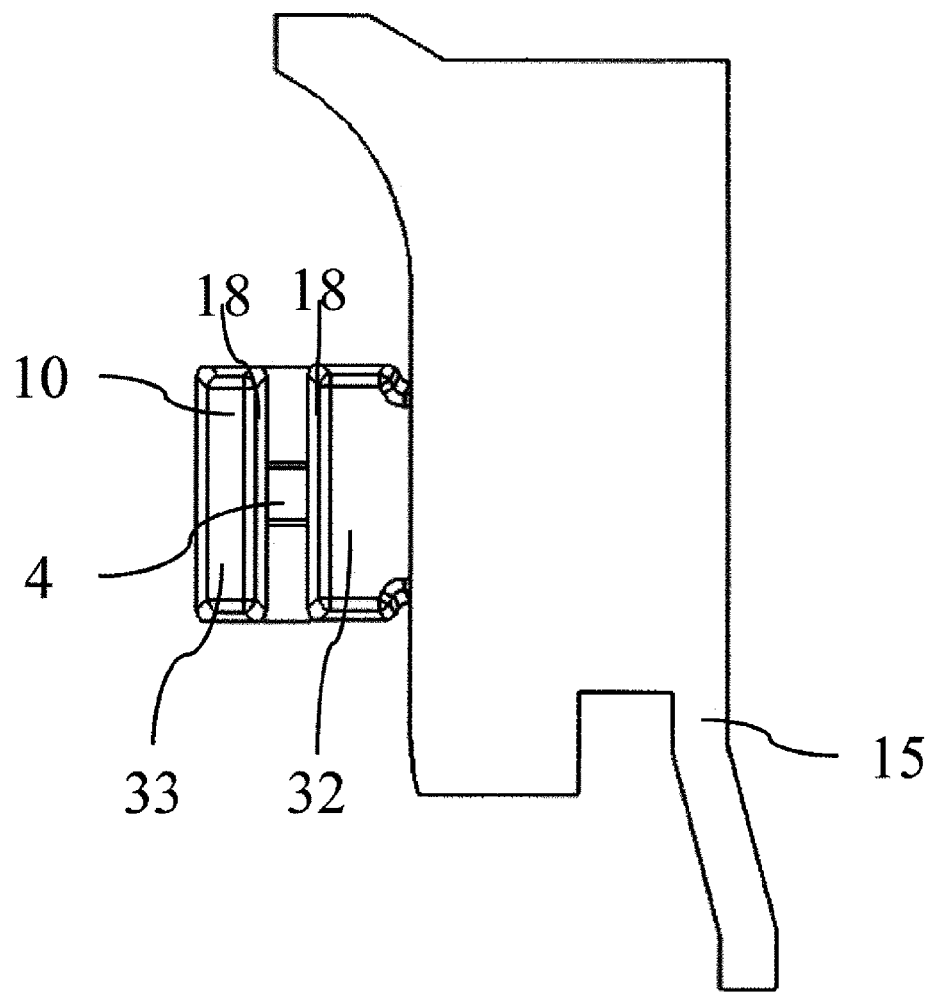
FIG. 9 is a bottom view of a circuit board and a sensor assembly according to a second embodiment of the invention.

As illustrated in FIG. 9, the sensor assembly 10 is accommodated in the housing 11 such that the detection portion side of the sensor assembly 10 comes into contact with the housing 11 on the distal end side of the detection portion of the flow-rate detecting element 4 and on the other end side (mounting portion side with the circuit board 15) of the detection portion of the flow-rate detecting element 4.

In other words, the sensor assembly 10 has a first contact portion and a second contact portion in contact with the housing 11 on the detection portion side, and the detection portion is located between the first contact portion and the second contact portion.

With the above-described configuration, an air passage 13 is formed around the flow-rate detecting element 4. The housing 11 and the sensor assembly 10 come into contact with the detection portion on the distal end side and the other end side in the protruding direction from the circuit board 15, so that the air passage 13 has a structure that is open in the main flow direction of the sub-passage 12 and is not open (becomes a minute opening) in the direction intersecting the main flow direction of the sub-passage 12. That is, it is possible to suppress the flow of the fluid flowing on the detection portion side (front side) of the sensor assembly 10 to the opposite side (back side) of the sensor assembly 10. That is, since the disturbance of the air around the detection portion can be suppressed, the flow rate measurement accuracy can be improved.

In addition, the first contact portion and the second contact portion of the sensor assembly 10 are in a state of being in contact with the housing 11, and are not a structure that is firmly fixed to the housing 11 like insertion or press-fitting. Therefore, since the sensor assembly 10 can be prevented from being deformed by the first contact portion and the second contact portion following the thermal contraction of the housing 11, it is possible to reduce the application of the bending stress with the first contact portion and the second contact portion as starting points to the detecting element. Therefore, according to this embodiment, even if the air passage 13 is configured by the housing 11 and the sensor assembly 10, the stress applied to the detection portion can be reduced, the characteristic fluctuation due to the deformation of the detection portion can be suppressed, and the flow-rate measuring device with high accuracy can be provided.

In addition, by bringing the housing 11 and the sensor assembly 10 into contact with each other and forming the air passage 13 by the housing 11 and the sensor assembly 10, a factor of dimensional tolerance of the air passage can be determined by the housing 11 and the sensor assembly 10, and the cover 31 and the circuit board 15 can be reduced from the factor of dimensional tolerance, so that dimensional tolerance variation can be reduced.

This embodiment includes: a resin package in which a flow-rate detecting element is sealed with resin such that at least a detection portion is exposed; a circuit board on which the resin package is mounted; and a housing on which the circuit board is mounted, in which the resin package is mounted on the circuit board such that the detection portion side is closer to the housing, the resin package has a contact portion in contact with the housing on the detection portion side, and the resin package is provided with the detection portion between a first contact portion in contact with the housing and a second contact portion.

Figure 10:
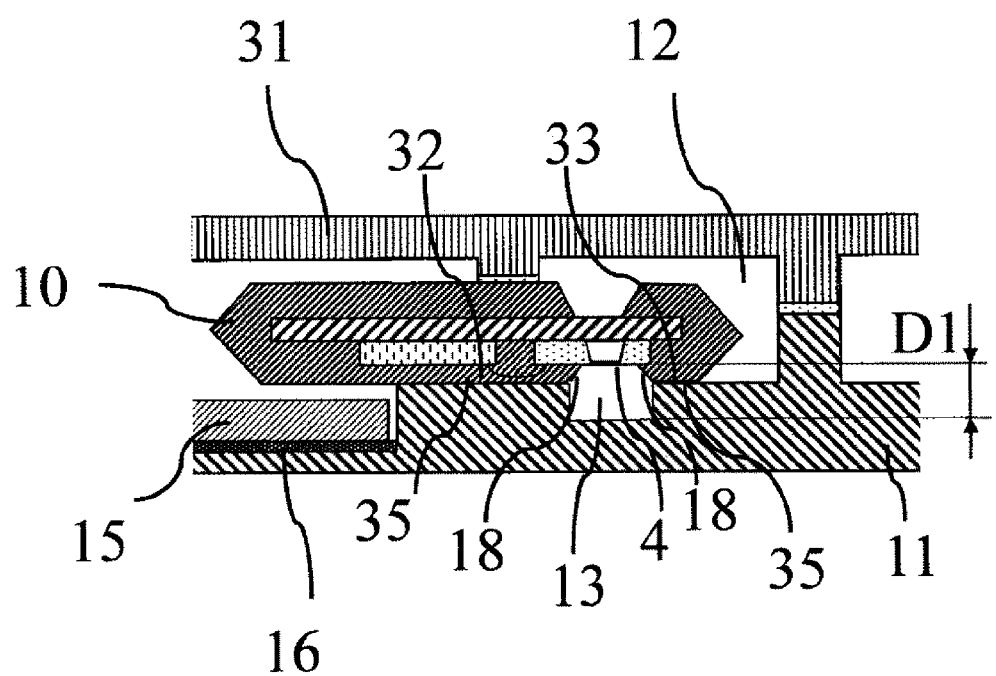
FIG. 10 is a cross-sectional view of the thermal air flow meter according to the second embodiment of the invention taken along line A-A in FIG. 2.

FIG. 10 illustrates a modification of the second embodiment. The distal end side of the sensor assembly 10 is substantially flush with the flow rate detection surface of the flow-rate detecting element 4, and the first contact portion and the second contact portion of the sensor assembly 10 are arranged to be offset in the thickness direction. The structure described above also achieves the same effects as those of the second embodiment.

Third Embodiment

Figure 13:
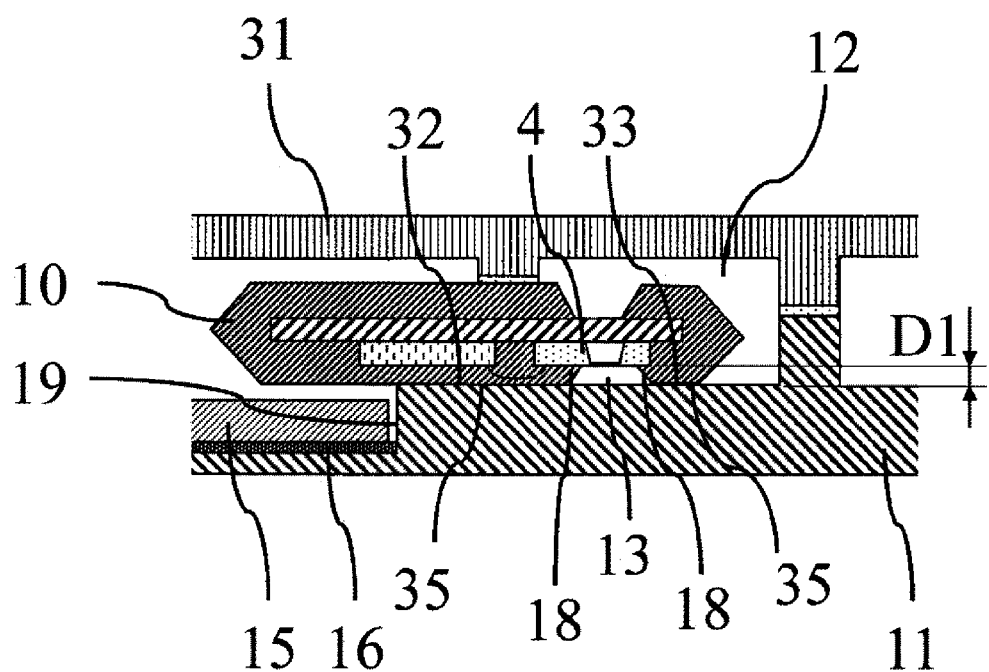
FIG. 13 is a cross-sectional view of the thermal air flow meter according to the third embodiment of the invention taken along line A-A in FIG. 2.

A third embodiment of the invention will be described using FIG. 13. The description of the same configuration as that of the previous embodiment will be omitted.

In this embodiment, the housing 11 is configured such that the wall surface portion constituting the air passage 13, the first contact portion 35 in contact with the first contact portion 32 of the sensor assembly 10, and the second contact portion 35 in contact with the second contact portion 33 of the sensor assembly 10 are substantially flush. In other words, a flat surface without a step is formed in the housing 11, the first contact portion 32 and the second contact portion 35 of the sensor assembly 10 are in contact with the flat surface, and the detection portion of the detecting element 4 faces the flat surface. That is, the housing 11 is formed such that the contact portion 35 in contact with the sensor assembly 10 and the facing portion facing the detection portion are substantially flush.

According to this embodiment, since the height D1 of the air passage 13 is determined by the sensor assembly 10, the influence of the thickness variation of the housing 11 can be eliminated from the dimensional variation of D1. That is, only the height variation of the side wall 18 of the sensor assembly 10 affects the D1 dimension. Therefore, the D1 dimension can be positioned with higher accuracy.

Figure 11:
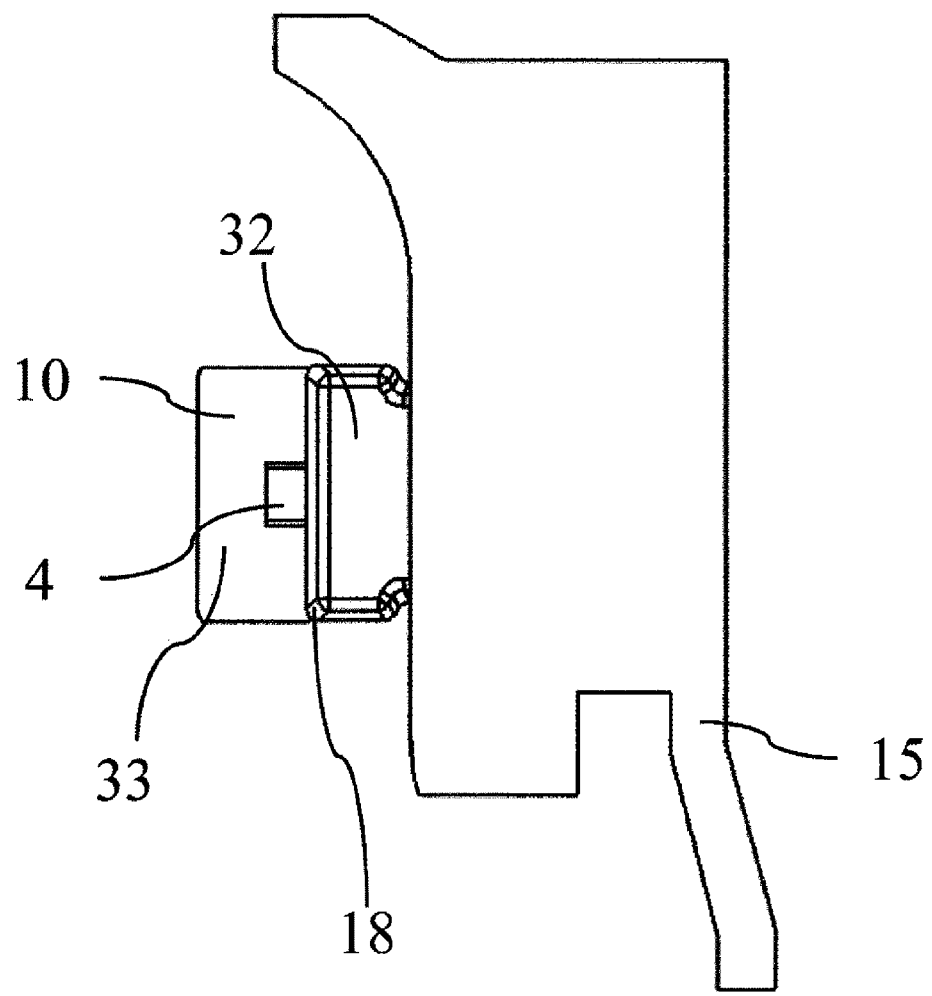
FIG. 11 is a bottom view of the circuit board and the sensor assembly according to the second embodiment of the invention.
Figure 12:
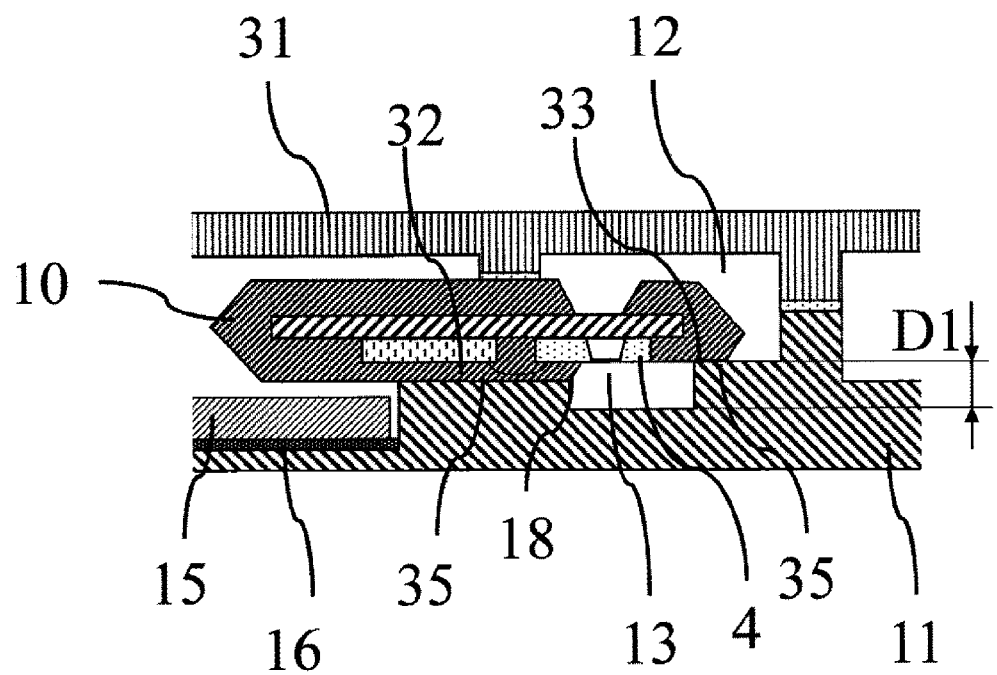
FIG. 12 is a cross-sectional view of a thermal air flow meter according to a third embodiment of the invention taken along line A-A in FIG. 2.

Further, as illustrated in FIG. 11, when the air passage 13 is formed by bringing both ends of the side wall 18 formed by the sensor assembly 10 into contact with the housing 11, a passage closed with respect to the sub-passage 12 can be formed. As a result, turbulence of the air flowing through the air passage 13 can be suppressed, and the height D1 can be positioned with high accuracy, so that the flow rate measurement performance can be further improved. Therefore, the tolerance of the housing 11 does not affect the D1 dimension. Therefore, with respect to the height D1 of the air passage 13, highly accurate positioning of D1 in which influences such as variations in the thickness of the circuit board 15, variations in mounting of the connection portion 14 connecting the sensor assembly 10 and the circuit board 15, and variations in the thickness of the cover 31 are removed becomes possible, and the flow rate measurement performance is improved.

Fourth Embodiment

Figure 14:
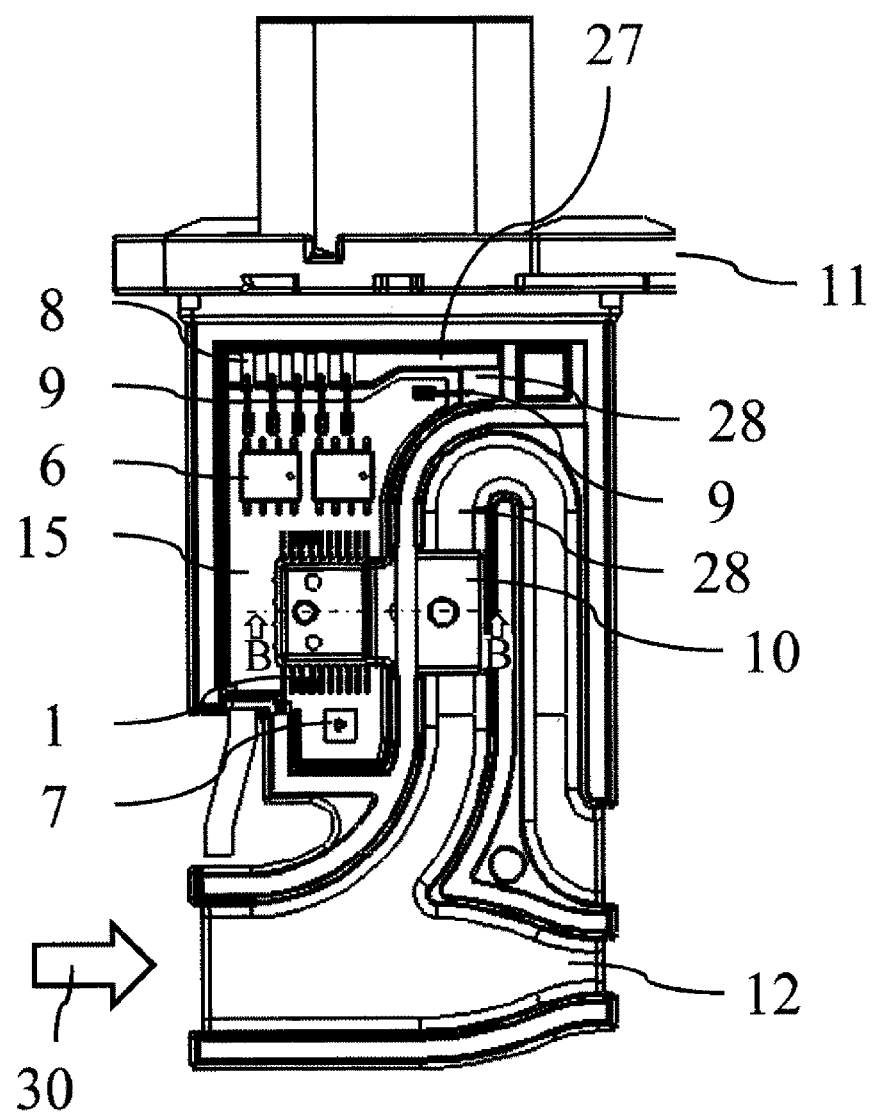
FIG. 14 is a plan view of a thermal air flow meter according to a fourth embodiment of the invention before attachment of the cover.
Figure 15:
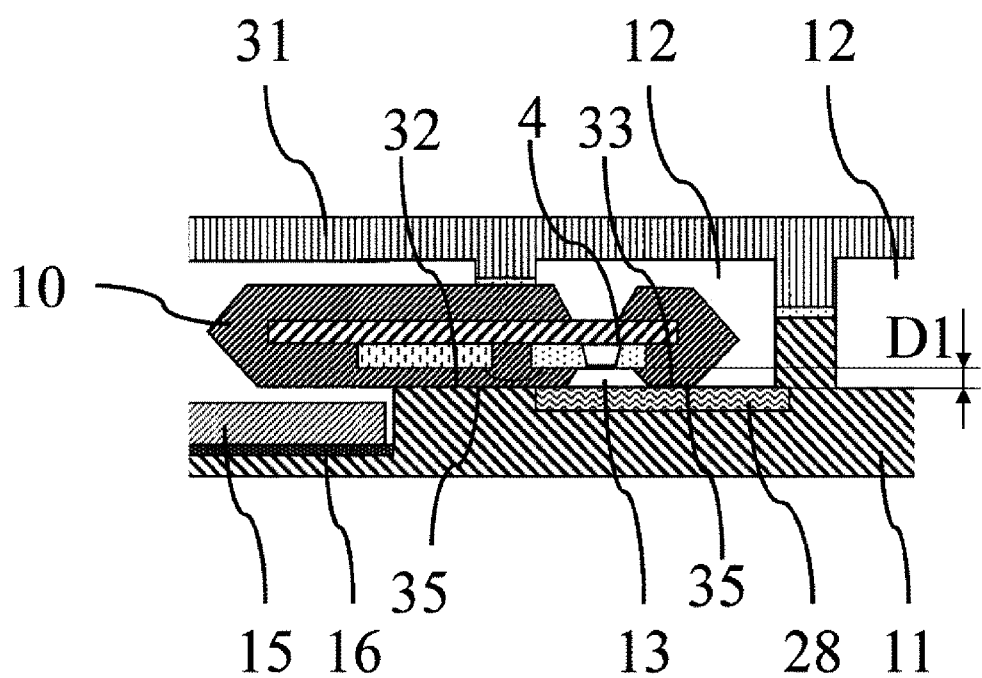
FIG. 15 is a cross-sectional view of the thermal air flow meter according to the fourth embodiment of the invention taken along line B-B in FIG. 12.

Next, a fourth embodiment of the invention will be described using FIGS. 14 and 15. The description of the same configuration as that of the previous embodiment will be omitted.

In this embodiment, a part of the sub-passage wall surface of the housing 11 includes an electrostatic diffusion region 28. The electrostatic diffusion region 28 is more preferably provided in a region facing the detection portion. The electrostatic diffusion region 28 has a function of removing electric charge of dust or the like coming flying together with air.

Fouling such as dust is charged by friction. Wiring constituting a heater or the like is formed in the detection portion of the flow-rate detecting element, and is attracted by an electric field generated by a current flowing through the wiring and deposited on the flow-rate detection portion. According to this embodiment, it is possible to suppress the accumulation of contaminants on the flow-rate detection portion by removing charges such as dust, and the contamination resistance is improved.

The electrostatic diffusion region 28 may be formed of a conductive resin containing carbon or the like, may be formed of a metal plate, or may be formed by depositing metal plating on a housing. The electrostatic diffusion region is preferably fixed at a constant potential, and is preferably fixed at a GND potential.

An advantage of forming the electrostatic diffusion region 28 in the housing 11 by inserting the metal plate into the housing 11 is that the rigidity of the housing is improved, so that the shape of the sub-passage can be suppressed from being deformed by vibration, and the change in D1 can be reduced, so that the flow rate measurement accuracy can be further improved. Here, in a case where the metal plate is insert-fixed to the housing 11, a minute step is generated between the surface of the housing 11 and the surface of the metal plate as the resin runs over the surface of the metal plate. However, since the thickness is negligible with respect to the dimensional variation D1, the thickness is within the range of substantially the same plane in the third embodiment.

Fifth Embodiment

Next, a fifth embodiment of this invention will be described with reference to FIG. 16. The description of the same configuration as that of the previous embodiment will be omitted.

A configuration different from the above embodiment is that the side wall 18 of the air passage 13 formed by the sensor assembly 10 has a throttle shape so as to be narrowed toward the flow-rate detecting element 4.

In a case where the flow velocity is improved by narrowing the sub-passage wall surface facing the flow-rate detecting element 4, the flow becomes a flow of air blown against the detection surface of the flow-rate detecting element, and contaminants are likely to be accumulated on the detection portion. On the other hand, by forming a diaphragm on the side wall 18 formed in the sensor assembly 10 and narrowing the diaphragm in a direction parallel to the detection surface of the detection portion, it is possible to reduce the flow of air blown to the detection portion, and the stain resistance is improved.

In addition, in a case where the throttle is formed on the sub-passage wall surface facing the detecting element, it is necessary to form the throttle by a member different from the sensor assembly 10. However, dimensional variation of the different member is added to D1 dimensional variation. Thus, by forming the throttle by the side wall 18 of the sensor assembly 10, dimensional variation of the different member can be excluded from the flow D1 dimensional variation. In particular, when being combined with the third embodiment, the effect of the latter is increased.

Therefore, in the invention described in this embodiment, as illustrated in FIG. 10, the throttle is formed by the side wall 18 of the sensor assembly 10, and the influence on the height D1 of the air passage 13 and the air passage 13 can be suppressed. Further, the throttle is formed on the side wall 18 of the air passage 13 so as to be narrowed toward the flow-rate detecting element 4. Although the example in which the side wall 18 is formed on the circuit board side and the distal end side has been described, the side wall may be formed on either one of the circuit board side and the tip side.

Figure 16:
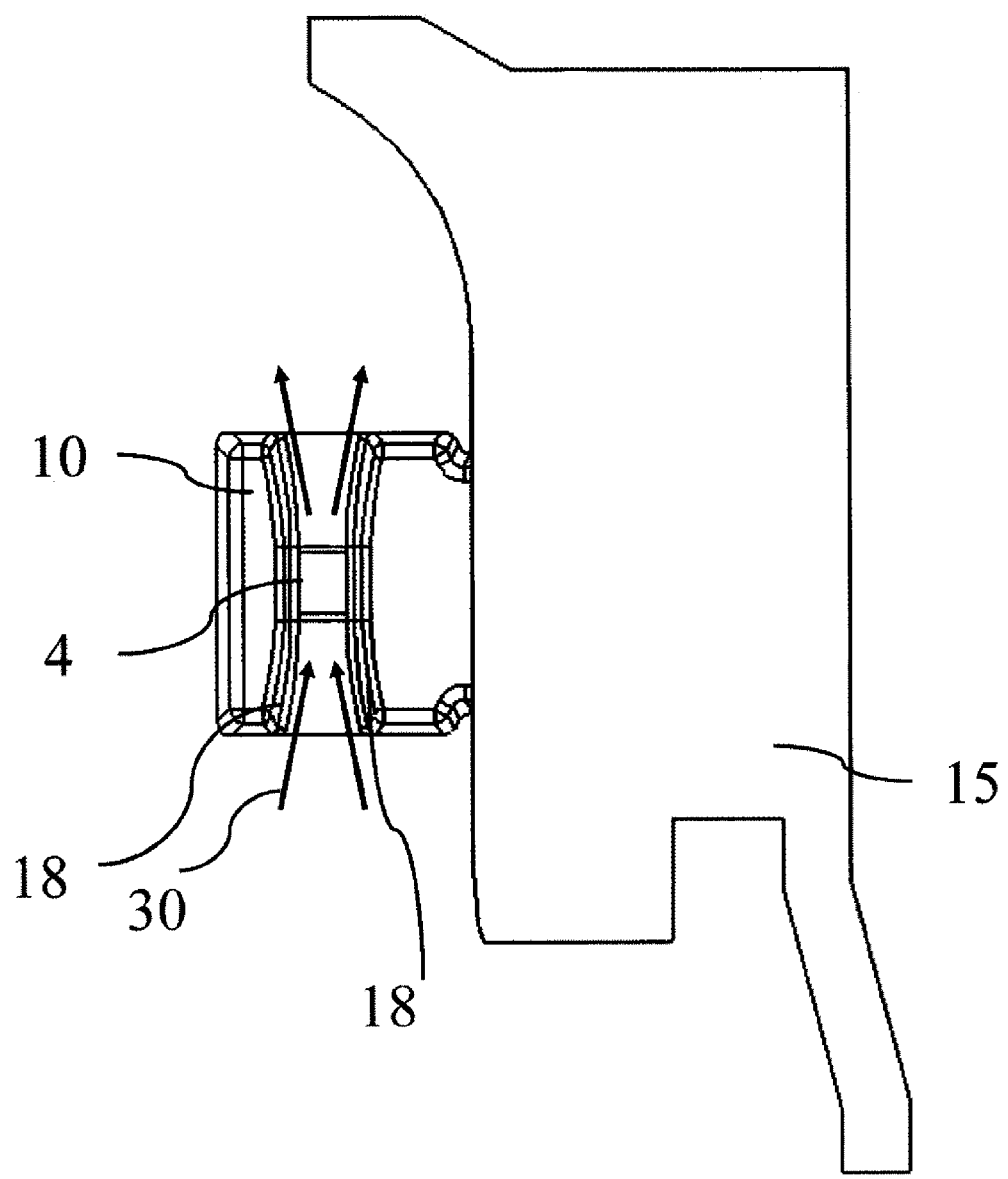
FIG. 16 is a bottom view of a circuit board and a sensor assembly according to a fifth embodiment of the invention.

As illustrated in FIG. 16, the air 30 is reduced in flow while being parallel to the flow rate detection surface of the flow-rate detecting element 4. As a result, since the frequency at which the contamination substance contained in the air 30 collides with the flow-rate detecting element 4 can be reduced, the reliability of the flow-rate detecting element 4 is improved. In addition, the air 30 flowing into the air passage 13 flows toward the flow-rate detecting element 4 while being reduced by the throttle, whereby the inflow speed of the air can be improved, and the flow rate measurement sensitivity can be improved by stabilizing the air flow rate distribution. In addition, by providing the throttle shape on the side wall 18, the throttle does not affect the D1 dimensional variation between the flow-rate detecting element 4 and the housing 11. Therefore, according to this embodiment, it is possible to prevent contamination of the flow-rate detecting element 4 and further improve the flow rate measurement sensitivity without affecting the D1 dimensional variation. It goes without saying that the present configuration also achieves the same operation and effect as those of the previous embodiment.

Sixth Embodiment

Next, a sixth embodiment of the invention will be described using FIGS. 17 to 19. The description of the same configuration as that of the previous embodiment will be omitted.

Figure 17:
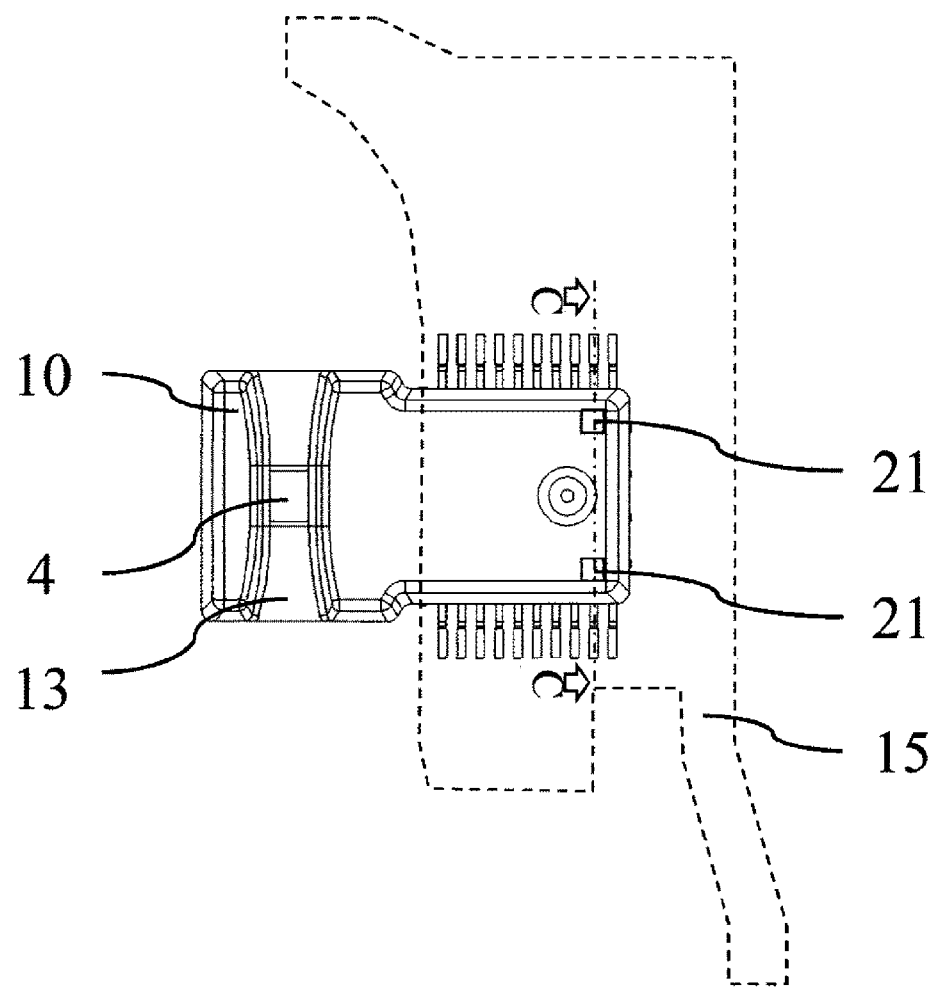
FIG. 17 is a bottom view of a sensor assembly according to a sixth embodiment of the invention.
Figure 18:
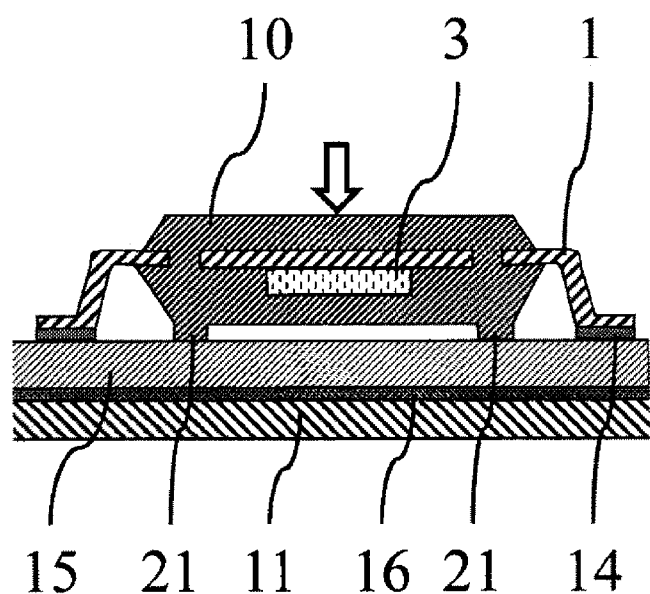
FIG. 18 is a cross-sectional view of a circuit board and a sensor assembly according to the sixth embodiment of the invention taken along line C-C in FIG. 15.

A configuration different from that of the previous embodiment is that at least one protrusion 21 is formed on the circuit board 15 side of the sensor assembly 10 as illustrated in FIGS. 17 and 18. In a process of fixing the circuit board 15 on which the sensor assembly 10 is mounted to the housing 11, the sensor assembly 10 receives a pressing force from, for example, a chip mounter in a direction of an arrow in FIG. 16. Due to this pressing force, the sensor assembly 10 may tilt, and the positioning accuracy of the height D1 of the air passage 13 may decrease. By forming the protrusion 21 on the side of the circuit board 15 of the sensor assembly 10, the sensor assembly 10 can be supported on the circuit board 15 by the protrusion 21 and the inclination of the sensor assembly 10 can be suppressed even when being pressed in the arrow direction of FIG. 16. Accordingly, the positioning accuracy of the height D1 of the air passage 13 can be maintained with high accuracy. Further, the deformation of the connection portion 14 between the sensor assembly 10 and the circuit board 15 and the lead frame 1 can also be suppressed, and the stress generated in these components can be reduced, so that the reliability of the sensor assembly 10 is improved.

Figure 19:
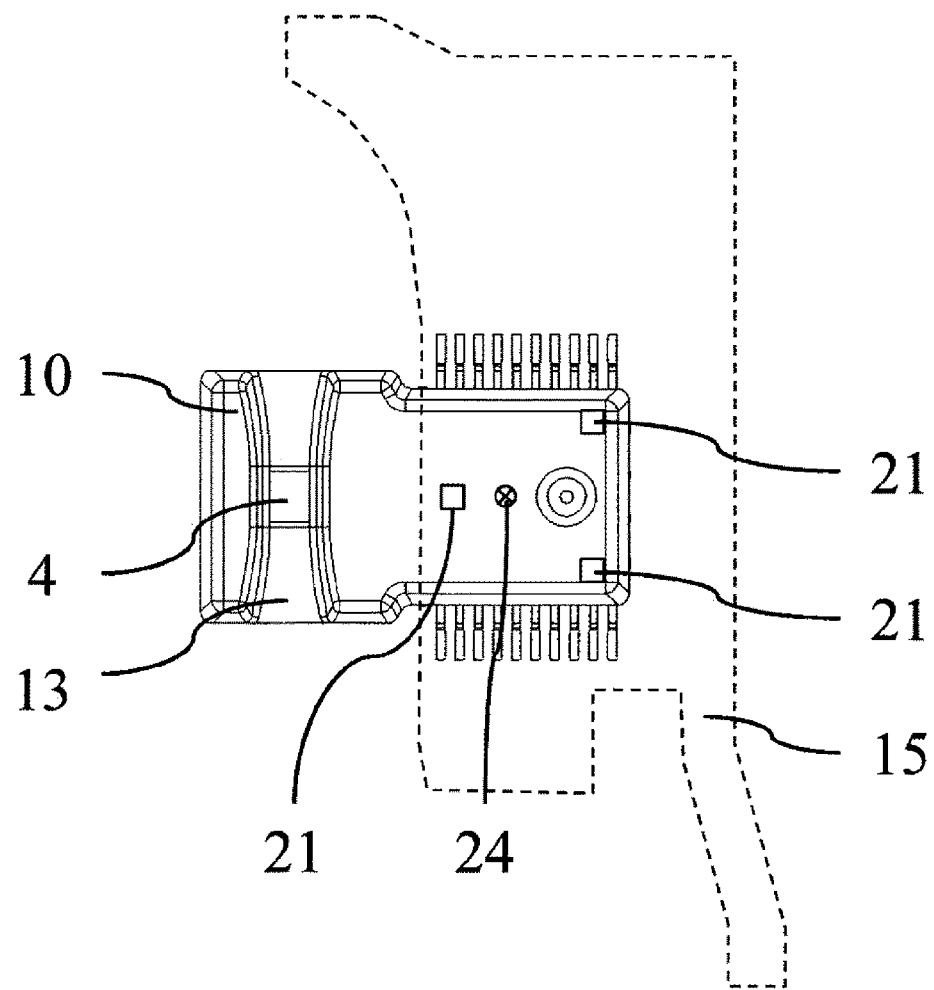
FIG. 19 is a bottom view of the sensor assembly according to the sixth embodiment of the invention.

In addition, as illustrated in FIG. 19, by forming the protrusions 21 at least at three positions of the sensor assembly 10 and positioning a barycentric position 24 of the sensor assembly 10 in the region connecting the protrusions 21, the sensor assembly 10 before mounting can stand on the circuit board 15, and the inclination of the sensor assembly 10 in the step of connecting to the circuit board 15 can be suppressed. It goes without saying that the present configuration also achieves the same operation and effect as those of the previous embodiment.

Seventh Embodiment

Next, a seventh embodiment of the invention will be described using FIGS. 18 to 21. The description of the same configuration as that of the previous embodiment will be omitted.

FIG. 18 is a plan view of the thermal air flow meter according to the seventh embodiment before attachment of the cover. FIG. 19 is a bottom view of a circuit board and a sensor assembly according to the seventh embodiment.

Figure 20:
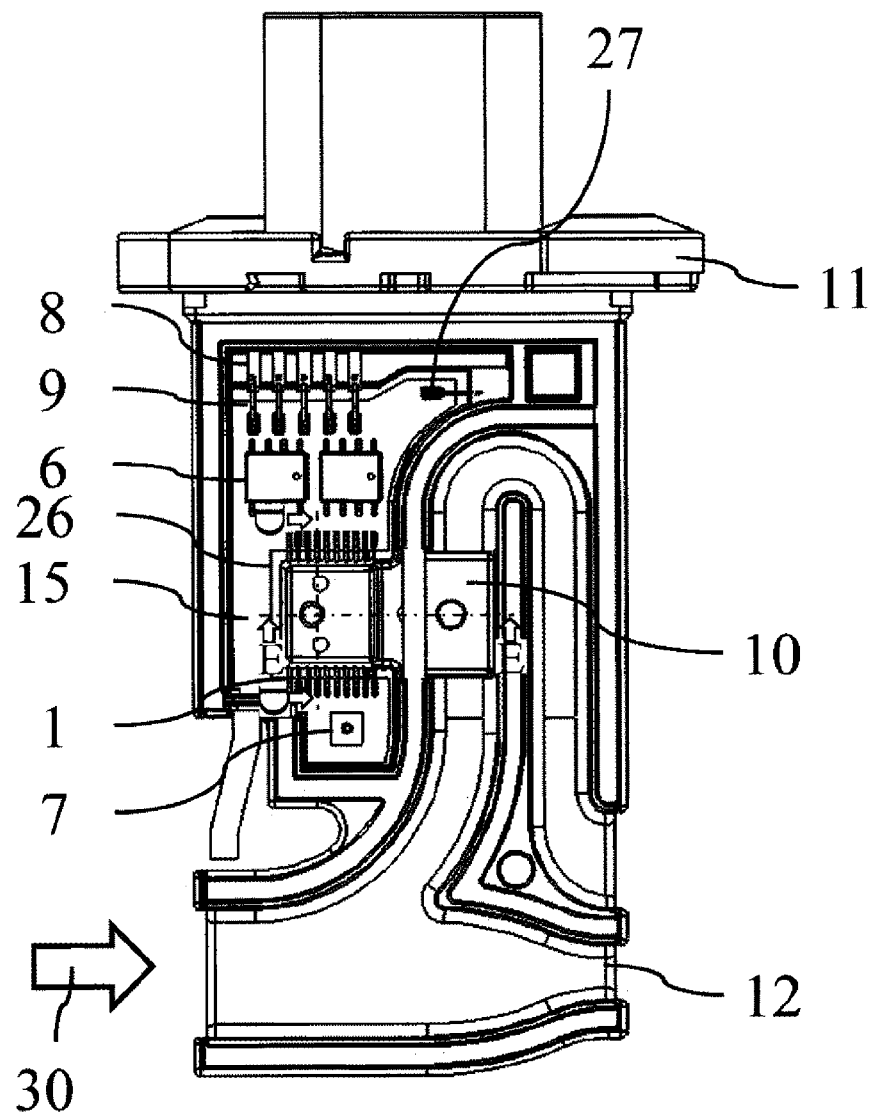
FIG. 20 is a plan view of a thermal air flow meter according to a seventh embodiment of the invention before attachment of a cover.
Figure 21:
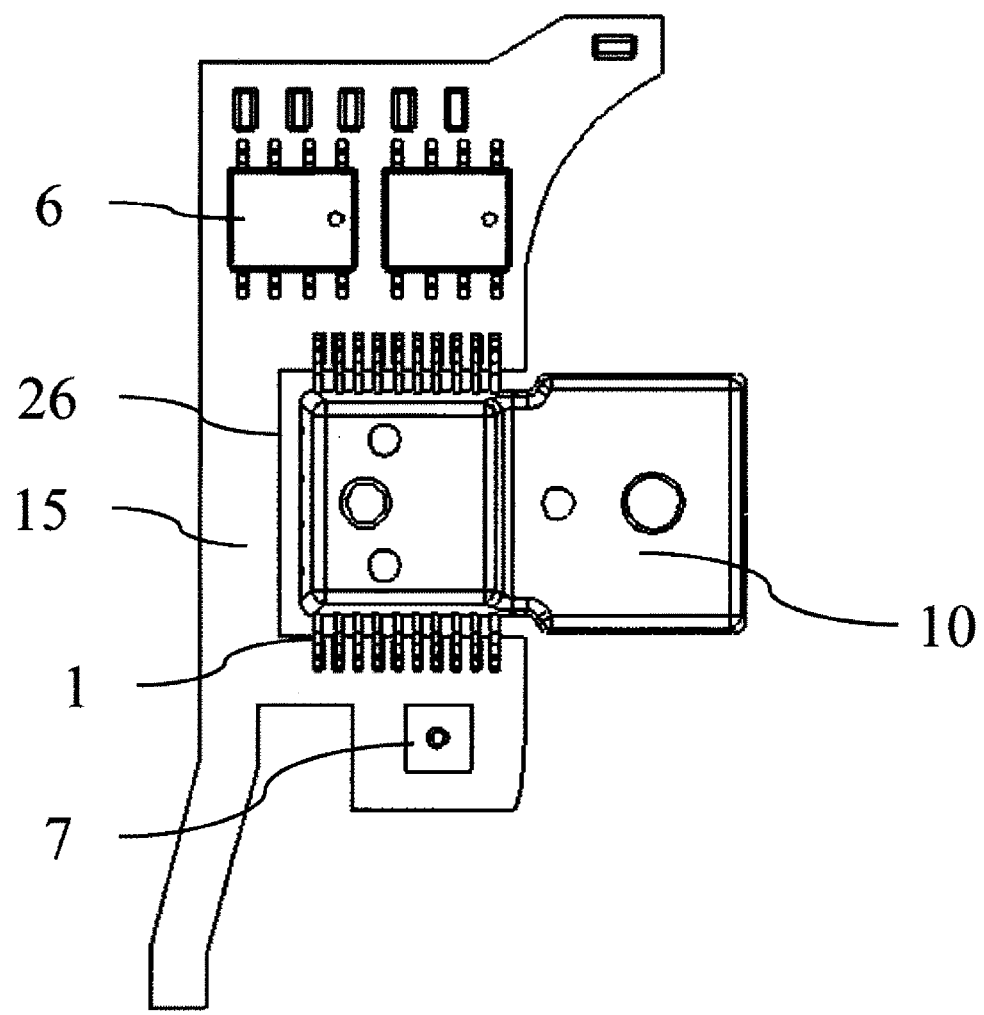
FIG. 21 is a plan view of a circuit board and a sensor assembly according to the seventh embodiment of the invention.
Figure 22:
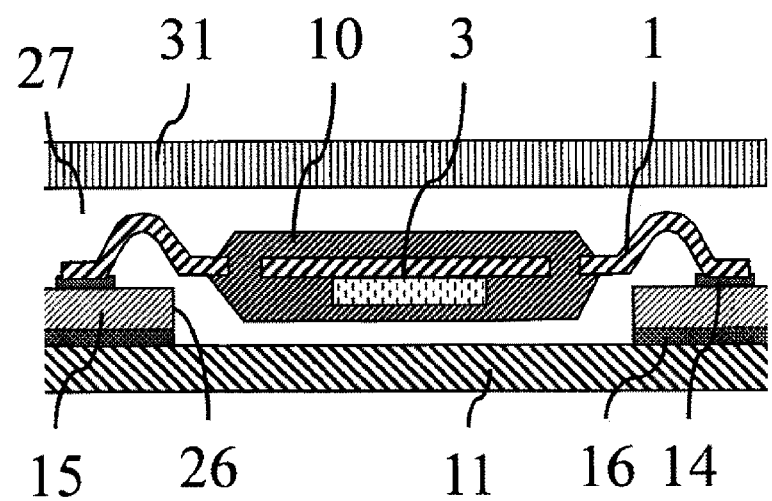
FIG. 22 is a cross-sectional view taken along line D-D in FIG. 18 of the thermal air flow meter according to the seventh embodiment of the invention.
Figure 23:
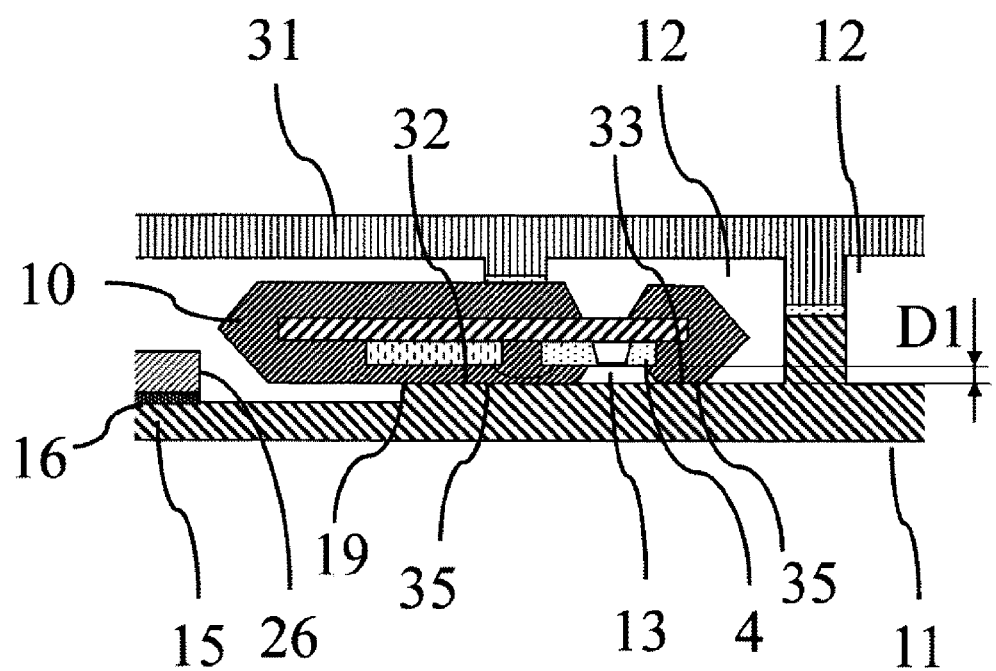
FIG. 23 is a cross-sectional view of the thermal air flow meter according to the seventh embodiment of the invention taken along line E-E in FIG. 18.

A configuration different from that of the previous embodiment is that an opening 26 is formed in a part of the circuit board 15 as illustrated in FIGS. 18 and 19, and the sensor assembly 10 is disposed in the opening as illustrated in FIGS. 20 and 21. As a result, the height from the fixing surface of the housing 11 of the circuit board 15 after mounting to the surface of the sensor assembly 10 on the cover 31 side is reduced, and the thickness of the entire thermal air flow meter is reduced, so that the pressure loss of the air 30 flowing through the main passage can be reduced. It goes without saying that the present configuration also achieves the same operation and effect as those of the previous embodiment. Although the example in which the opening 26 is provided in the circuit board 15 has been described, the thickness of the thermal air flow meter can be similarly reduced by forming a groove in the circuit board 15 to reduce the thickness of a part thereof.

Eighth Embodiment

Figure 24:
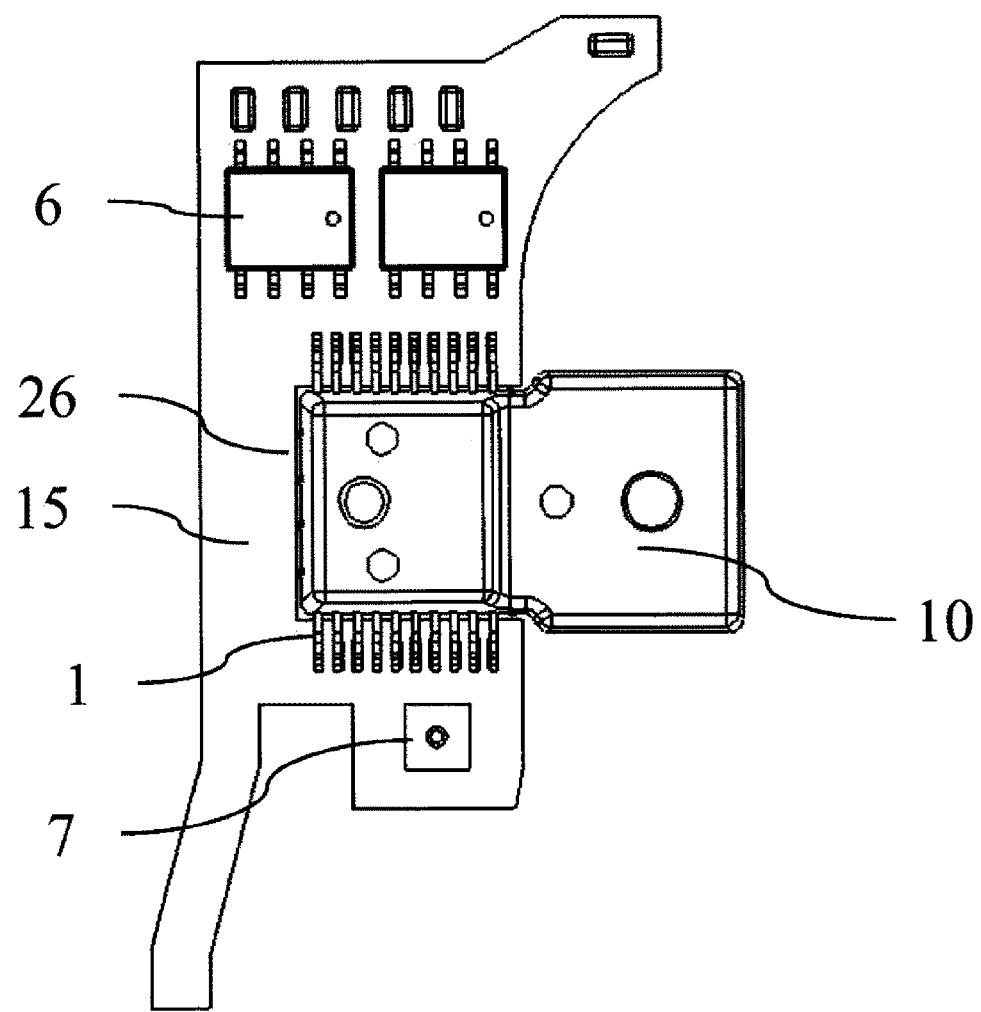
FIG. 24 is a plan view of a circuit board and a sensor assembly according to an eighth embodiment of the invention.

Next, an eighth embodiment of the invention will be described using FIGS. 24 to 26. The description of the same configuration as that of the previous embodiment will be omitted.

Figure 25:
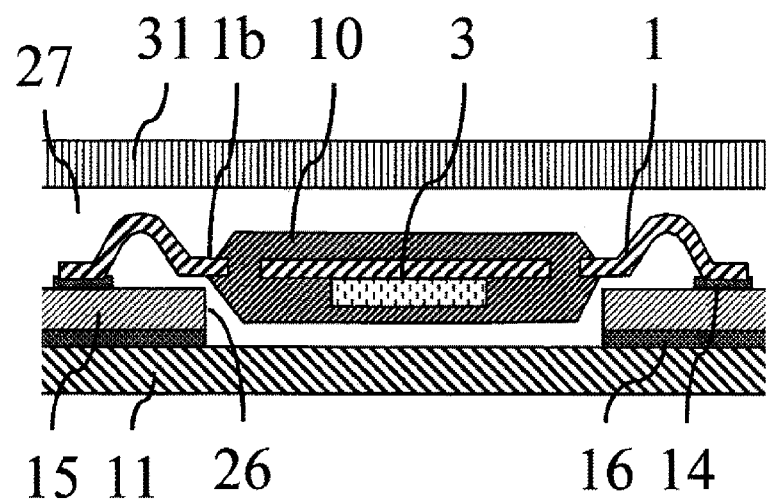
FIG. 25 is a cross-sectional view of the thermal air flow meter according to the eighth embodiment of the invention taken along line D-D in FIG. 18.
Figure 26:
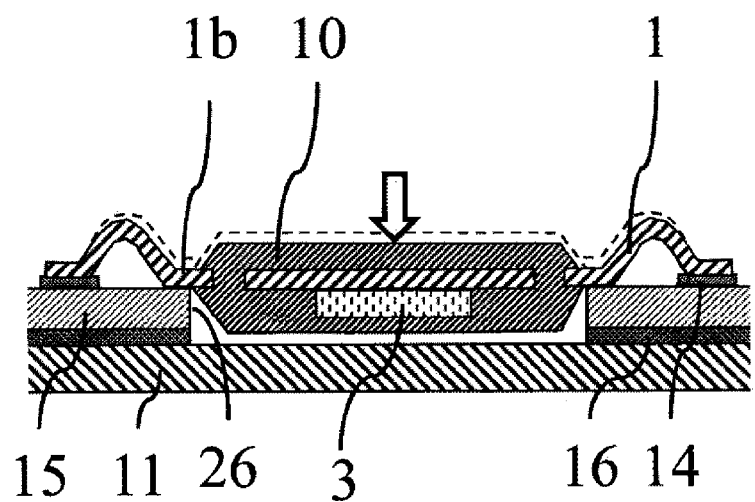
FIG. 26 is a cross-sectional view taken along line D-D in FIG. 18 when the sensor assembly is mounted in the eighth embodiment according to the invention.

A configuration different from the above embodiment is that, in the circuit board 15 having the opening 26, as illustrated in FIG. 25, the opening 26 is formed such that the circuit board 15 is positioned immediately below a root straight portion 1b of the lead frame 1 extending to the outside of the sensor assembly 10. In a process of fixing the circuit board 15 on which the sensor assembly 10 is mounted to the housing 11 as illustrated in FIG. 26, the sensor assembly 10 receives a pressing force from, for example, a chip mounter in a direction of an arrow in FIG. 24. Due to this pressing force, the sensor assembly 10 may be deformed, and the positioning accuracy of the height D1 of the air passage 13 may be lowered. Since the root straight portion 1b of the lead frame 1 is positioned on the circuit board 15, as illustrated in FIG. 26, when the circuit board 15 and the root straight portion 1b come into contact with each other, the sensor assembly 10 can be supported by the contact portion, so that further deformation of the sensor assembly 10 can be suppressed. As a result, it is possible to suppress a decrease in positioning accuracy of the height D1 of the air passage 13.

Ninth Embodiment

Figure 27:
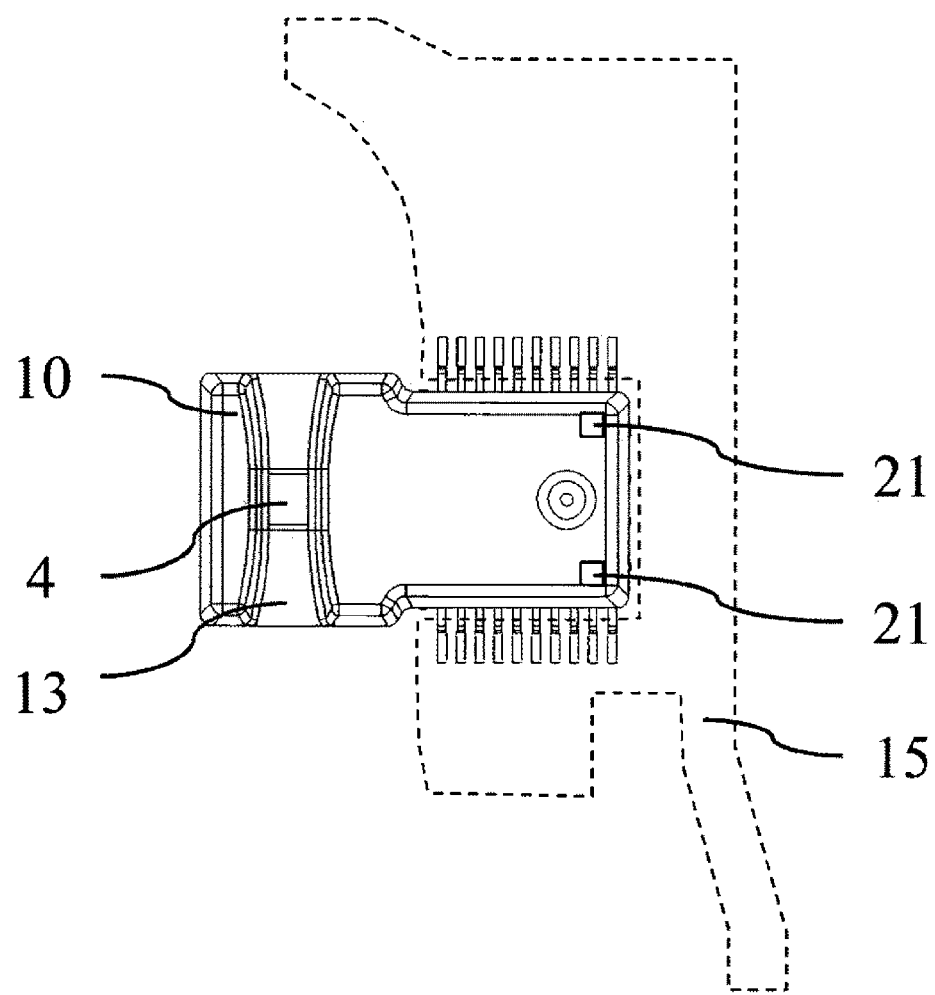
FIG. 27 is a bottom view of a sensor assembly according to a ninth embodiment of the invention.
Figure 28:
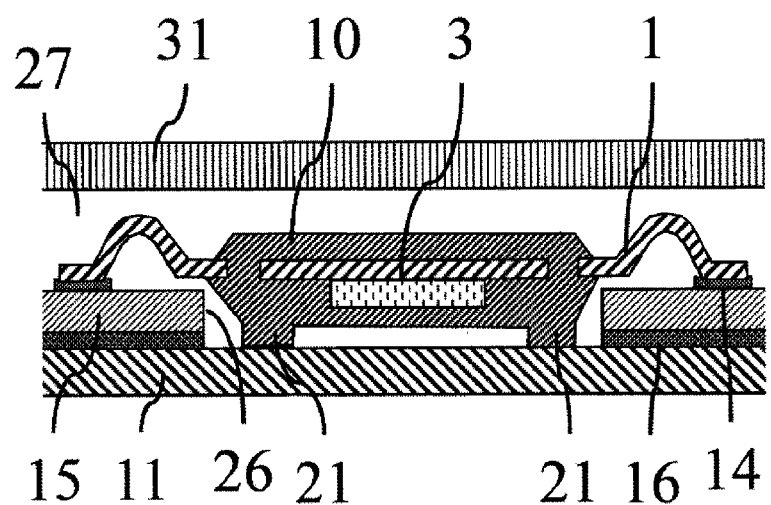
FIG. 28 is a cross-sectional view of a thermal air flow meter according to the ninth embodiment of the invention taken along line D-D in FIG. 18.
Figure 29:
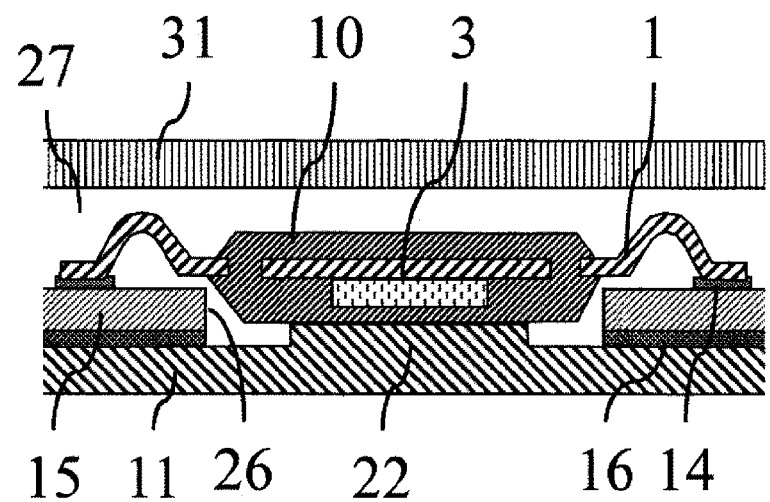
FIG. 29 is a cross-sectional view of the thermal air flow meter according to the ninth embodiment of the invention taken along line D-D in FIG. 18.

Next, a ninth embodiment of the invention will be described using FIGS. 27 to 29. The description of the same configuration as that of the previous embodiment will be omitted.

A configuration different from that of the above embodiment is that in the circuit board 15 having the opening 26, the protrusion 21 is formed at least at one place of the sensor assembly 10. The protrusion 21 is provided closer to the connection portion 14 with the circuit board 15 than the contact portions 32 and 33 with the housing 11. As described above, when the protrusion 21 is formed in the sensor assembly 10, the sensor assembly 10 can be supported by the protrusion 21 when a pressing force is applied when the circuit board 15 is fixed to the housing 11. As a result, deformation of the sensor assembly 10 can be suppressed, and the positioning accuracy of the height D1 of the air passage 13 can be improved. In addition, as illustrated in FIG. 29, it is needless to say that the configuration in which the protrusion 22 is formed on the housing 11 side to support the sensor assembly 10 has the same operational effects as those of the above embodiment.

REFERENCE SIGNS LIST 1 lead frame
2 gold wire
3 LSI
4 flow-rate detecting element
6 pressure sensor
7 humidity sensor
8 connector terminal
9 metal wire
10 sensor assembly
11 housing
12 sub-passage
13 air passage
14 connection portion
15 circuit board
16 buffering material
17 adhesive
18 side wall
19 step
20 air passage height
21 protrusion
22 protrusion
24 barycentric position
26 opening
27 circuit chamber
28 electrostatic diffusion region
30 air
31 cover
32 first contact portion
33 second contact portion
34 circuit board mounting portion
35 contact portion

The invention claimed is:

1. A flow-rate measuring device, comprising:
a sensor assembly having a flow-rate detecting element;
a circuit board on which the sensor assembly is mounted; and
a housing on which the circuit board is mounted,
wherein the sensor assembly is mounted on the circuit board such that a detection portion side of the flow-rate detecting element is closer to the housing, and
wherein the sensor assembly includes a contact portion in contact with the housing on the detection portion side.

2. The flow-rate measuring device according to claim 1, wherein the sensor assembly includes a second contact portion on the detection portion side, the second contact portion being in contact with the housing, and
wherein the detection portion is provided between the contact portion and the second contact portion.

3. The flow-rate measuring device according to claim 1, wherein the housing is formed with a step such that the circuit board mounting portion is positioned outside the sensor assembly contact portion, and
wherein a height of the step is larger than a height from a bottom of the circuit board to the contact portion of the sensor assembly.

4. The flow-rate measuring device according to claim 3, wherein the circuit board is fixed to the housing via a buffering material.

5. The flow-rate measuring device according to claim 1, wherein the housing is formed such that a contact portion in contact with the sensor assembly and a facing portion facing the detection portion are substantially flush with each other.

6. The flow-rate measuring device according to claim 1, wherein the housing includes an electrostatic diffusion region at least in a region facing the detection portion.

7. The flow-rate measuring device according to claim 6, wherein the electrostatic diffusion region is a metal plate inserted into the housing.

8. The flow-rate measuring device according to claim 6, wherein the electrostatic diffusion region is made of a conductive resin material.

9. The flow-rate measuring device according to claim 6, wherein the electrostatic diffusion region is connected to a power supply or GND.

10. The flow-rate detection device according to claim 1, wherein the sensor assembly is a resin package in which the flow-rate detecting element is sealed with resin such that at least the detection portion is exposed.

11. The flow-rate measuring device according to claim 10, wherein the resin package has a side wall protruding toward the housing from the detection surface, and
wherein an upper surface of the side wall is a contact portion that comes into contact with the housing, and
wherein a side surface of the side wall has a shape narrowed toward a flow-rate detection portion.

12. The flow-rate measuring device according to claim 10, wherein the circuit board has a groove or an opening, and
wherein the resin package is mounted on the circuit board such that a part of the resin package is located in the groove or the opening.

13. The flow-rate measuring device according to claim 10, wherein a protrusion is formed on a detection portion side of the resin package, and
wherein the protrusion is provided closer to a connection portion with the circuit board than the contact portion.

14. The flow-rate measuring device according to claim 13, wherein a plurality of the protrusions is formed so as to surround a center of gravity of the resin package.

* * * * *